United States Patent [19]
Goodwin

[11] Patent Number: 5,285,058
[45] Date of Patent: Feb. 8, 1994

[54] OPTICAL SENSOR CONTROL INCLUDING THE SUSPENSION OF LIGHT RADIATION

[75] Inventor: R. Wendell Goodwin, Dunwoody, Ga.

[73] Assignee: Schlumberger Industries, Inc., Norcross, Ga.

[21] Appl. No.: 4,402

[22] Filed: Jan. 14, 1993

[51] Int. Cl.⁵ ............................ G01J 1/32; G01D 5/34
[52] U.S. Cl. .................................. 250/205; 250/231.14
[58] Field of Search .............. 250/205, 231.13, 231.14, 250/229, 237 G, 214 B; 341/13, 14

[56] References Cited
U.S. PATENT DOCUMENTS

| | | | |
|---|---|---|---|
| 4,725,723 | 2/1988 | Shimojima | 250/231.14 |
| 4,757,190 | 7/1988 | Ando et al. | 250/205 |
| 4,967,676 | 11/1990 | Hagino et al. | 250/205 |
| 4,972,078 | 11/1990 | Hasebe et al. | 250/231.14 |
| 5,132,527 | 7/1992 | Karpati | 250/205 |
| 5,223,710 | 6/1993 | Pavlak | 250/205 |

*Primary Examiner*—Michael Messinger
*Attorney, Agent, or Firm*—Sanford J. Asman

[57] ABSTRACT

An optical sensor for monitoring position of a movable object comprising a LED and a phototransistor is provided with control circuitry, which is responsive to an output signal generated by the phototransistor for causing the LED to suspend radiation of light. When the light reflected from a reflective area of the object falls on the phototransistor, the control circuitry turns off the LED as soon as the output of the phototransistor goes below a threshold level signifying that the phototransistor has been turned on. When the light is absorbed by a non-reflective area of the object and the phototransistor is not turned on, the control circuitry turns off the LED after a predetermined time period, which is chosen to be slightly larger than the response time of the phototransistor.

47 Claims, 3 Drawing Sheets

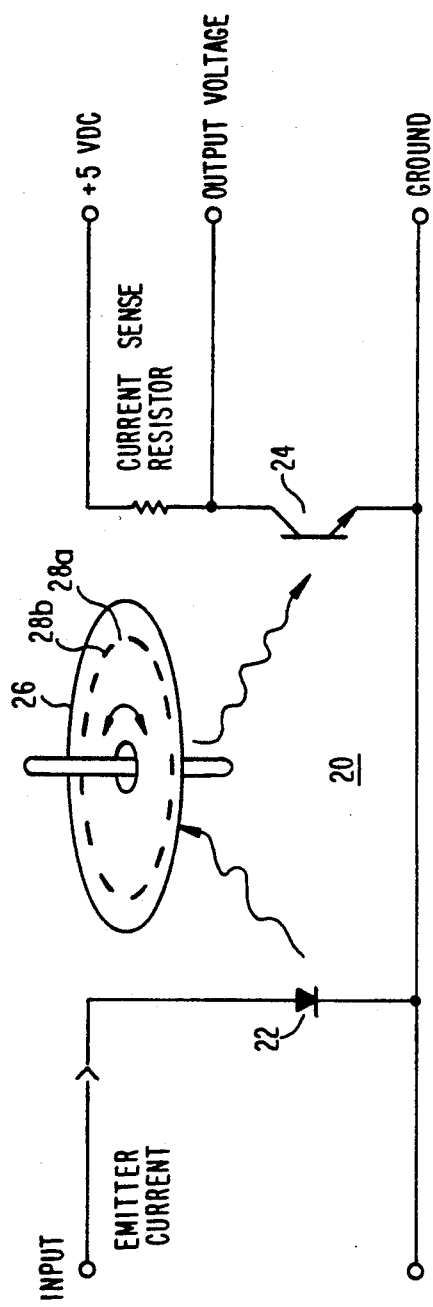
Figure 1 (PRIOR ART)
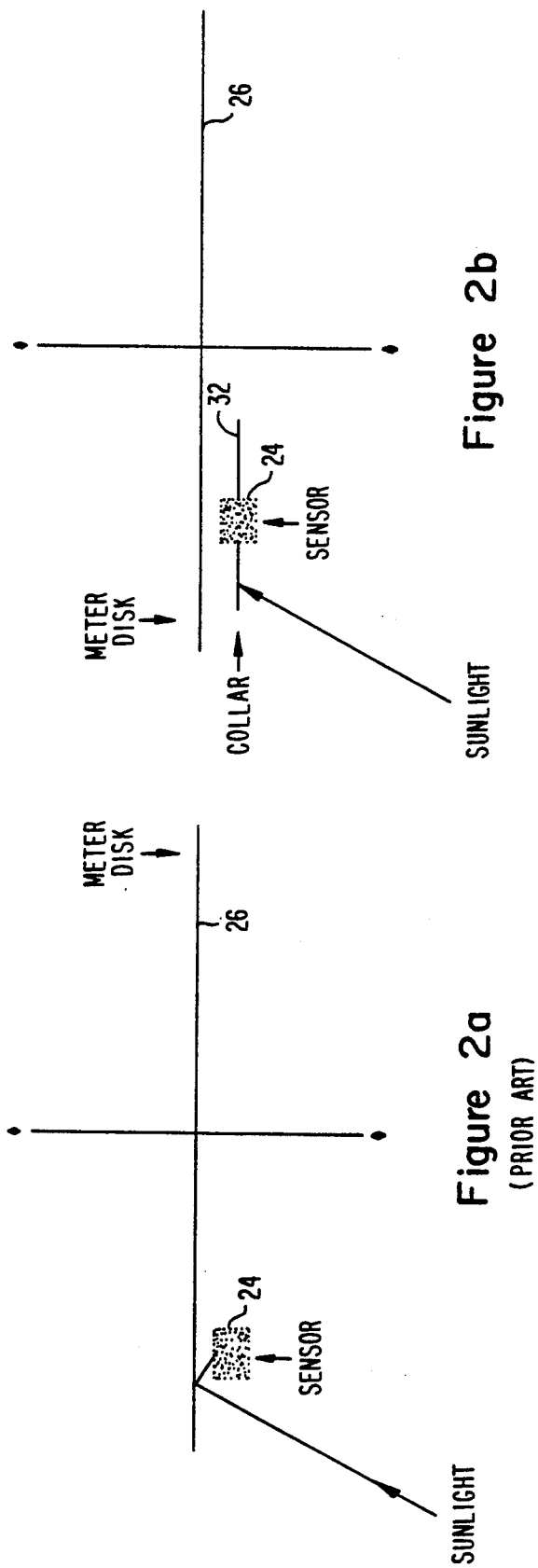
Figure 2a (PRIOR ART)
Figure 2b

5,285,058

OPTICAL SENSOR CONTROL INCLUDING THE SUSPENSION OF LIGHT RADIATION

TECHNICAL FIELD

This invention relates generally to electronic optical sensors for monitoring positions of moving objects, and more particularly, to a method of and apparatus for controlling the optical sensors to minimize power consumption.

BACKGROUND ART

Optical sensors are widely used to determine the position of moving objects. One example is in an electricity meter wherein the speed of rotation of an eddy disk is related to the rate at which electricity is being consumed. See, for example, U.S. Pat. No. 4,827,123 assigned to the assignee of the present invention.

All optical sensors comprise a light emitter and a light detector that establish an optical path that includes a disk or other moving object. The moving object may either occlude the direct light from emitter to detector ("opto-interruptor"), or the moving object may, by virtue of its reflective and non-reflective areas, modulate the amount of reflected light passing from emitter to detector (reflective sensor).

Reference is now made to FIG. 1, wherein an optical sensor 20 comprises a light-emitting diode (LED) 22 converting an input electrical signal into light radiation, and a phototransistor 24 which is sensitive to light radiated by the LED 22. A rotating meter disk 26 is positioned so as to reflect incident light radiated by the LED 22 onto the phototransistor 24. The reflecting surface of the disk 26 has reflective areas 28a which reflect incident light therefrom, and non-reflective areas 28b which absorb light rather than reflect it. The conventional metallic surface of the disk is normally shiny enough to reflect light without any modification, whereas the non-reflective areas can be provided through a black applique applied to the disk. The output of the sensor is low when the phototransistor 24 is illuminated, and the output is high when the phototransistor 24 is not illuminated.

The LED 22 may be always kept on by providing a constant current at the input. However, the magnitude of the constant current is limited by the ability of the LED to operate with continuous excitation.

Alternatively, the LED 22 may be pulsed at intervals smaller than the expected light-to-dark period of the rotating disk 26. The intermittent mode of operation allows the LED to be operated at higher power to increase peak brightness.

Sensitivity of the optical sensor is defined by a signal-to-noise ratio $R=(S+A)/(N+A)$, where:

S (signal) is the output phototransistor current resulting from light reflecting from a reflective area on the disk, N (noise) is the output phototransistor current resulting from light reflecting from a non-reflective area on the disk, and A (ambient) is the output phototransistor current resulting from background light.

In order to maximize R, the peak brightness should be as high as possible. Thus, the intermittent mode of operation allows a signal-to-noise ratio to be increased to improve sensitivity of optical sensors.

However, this mode of operation requires significant amount of power to be applied to the sensor in order to provide permanent LED pulsing with high peak brightness. Furthermore, permanent LED pulsing with high peak brightness results in reducing the mean time to failure (MTTF) of the LED, which is the average time before first failure of the LED. The MTTF is a measure of the reliability of the LED and the entire optical sensor.

In view of the above, it would be desirable to provide a method of and apparatus for controlling optical sensors to reduce power consumption without decreasing sensitivity. It would also be desirable to increase reliability of the optical sensor by increasing the mean time to failure of the LED.

DISCLOSURE OF THE INVENTION

Accordingly, one advantage of the invention is in reducing the power consumption of an optical sensor without decreasing sensitivity.

Another advantage of the invention is in improving the reliability of an optical sensor by increasing the mean time to failure of the LED.

The above and other advantages of the invention are achieved, at least in part, by providing an optical sensor with a control circuit which is responsive to an output signal generated by a light detector for causing a light emitter to suspend radiation of light. In accordance with one aspect of the invention, the control circuit comprises a threshold circuit which causes the light emitter to suspend radiation of the light in response to a predetermined level of the output signal under reflective conditions (i.e. when the incident light is reflected from a reflective area of a meter disk). During the reflective period, the threshold circuit turns off the LED as soon as the output of the phototransistor goes below a threshold level signifying that the light detector has been turned on. Therefore, no more power is used in the LED than is necessary to transmit the light signal to the phototransistor. The invention accordingly enables power consumption under the reflective conditions to be minimized.

In accordance with another aspect of the invention, the control circuit comprises a timer circuit, which under non-reflective conditions (i.e. when the incident light is absorbed by a non-reflective area of a disk), turns off the LED after expiration of a predetermined time interval. During the non-reflective period the output signal of the phototransistor remains high. The predetermined time interval is chosen to be slightly longer than the response time of the phototransistor, which is known and independent of temperature for a given type of phototransistors. Thus, during the non-reflective period the timer circuit leaves the LED on only for a short time interval required to make sure that the phototransistor is off. The invention accordingly makes it possible to minimize power consumption under non-reflective conditions.

As the LED is on only for small portions of reflective and non-reflective periods, the mean time to failure (MTTF) of the LED is increased. As a result, the reliability of the optical sensor is significantly improved.

In accordance with a preferred embodiment of the invention the LED is supplied with intermittently interrupted electric energy produced by a driving oscillator. The pulse-repetition period of the driving oscillator is less than intervals when the LED is turned off by the control circuit. The driving oscillator is responsive to a predetermined level of the output signal of the phototransistor for turning off the LED during the reflective period. Furthermore, the driving oscillator turns off the LED after a predetermined time interval during the non-reflective period.

In accordance with a further aspect of the invention, the control circuit may include a holding circuit which maintains a steady level of an output signal of the sensor for a preset time period. The holding circuit prevents the output signal from multiple transitions during a short time interval. The preset time period may be chosen so as to allow the next change in output state to occur only after three consecutive reflective or non-reflective periods.

In accordance with the method of the invention, the following steps are carried out. The method of monitoring moving objects using a light emitter and a light detector provides:

radiating light from the light emitter, sensing the radiated light by a light detector for producing an output signal, positioning the movable object so as to provide incidence of the light radiated by the light emitter on the detector in at least one first time interval and to prevent, at least in part, the light radiated by the light emitter from falling on the detector in at least one second time interval, suspending the radiating in response to a predetermined level of the output signal during the first time interval, and suspending the radiating after expiration of a predetermined time period during the second time interval.

The invention may be practiced with the movable object that rotates so as to reflect the radiated light during the first time interval and to absorb the radiated light during the second time interval. For example, a disk having a reflective surface with reflective and non-reflective areas may be used as such a movable object.

Also, the invention may be practiced with the movable object that rotates so as to pass the radiated light during the first time interval and to interrupt the radiated light during the second time interval. For example, a toothed wheel having a plurality of teeth for interrupting the radiated light may be used as such a movable object.

Still other advantages of the present invention will become readily apparent to those skilled in this art from the following detailed description, wherein only the preferred embodiment of the invention is shown and described, simply by way of illustration of the best mode contemplated of carrying out the invention. As will be realized, the invention is capable of other and different embodiments, and its several details are capable of modifications in various obvious respects, all without departing from the invention. Accordingly, the drawing and description are to be regarded as illustrative in nature, and not as restrictive.

BRIEF DESCRIPTION OF THE DRAWINGS

FIG. 1 is a schematic diagram of a prior art optical sensor.

FIG. 2a is a diagram illustrating sensor mounting.

FIG. 2b is a diagram illustrating use of a collar to prevent reflected sunlight saturation.

BEST MODE FOR PRACTICING THE INVENTION

Figure 3A:
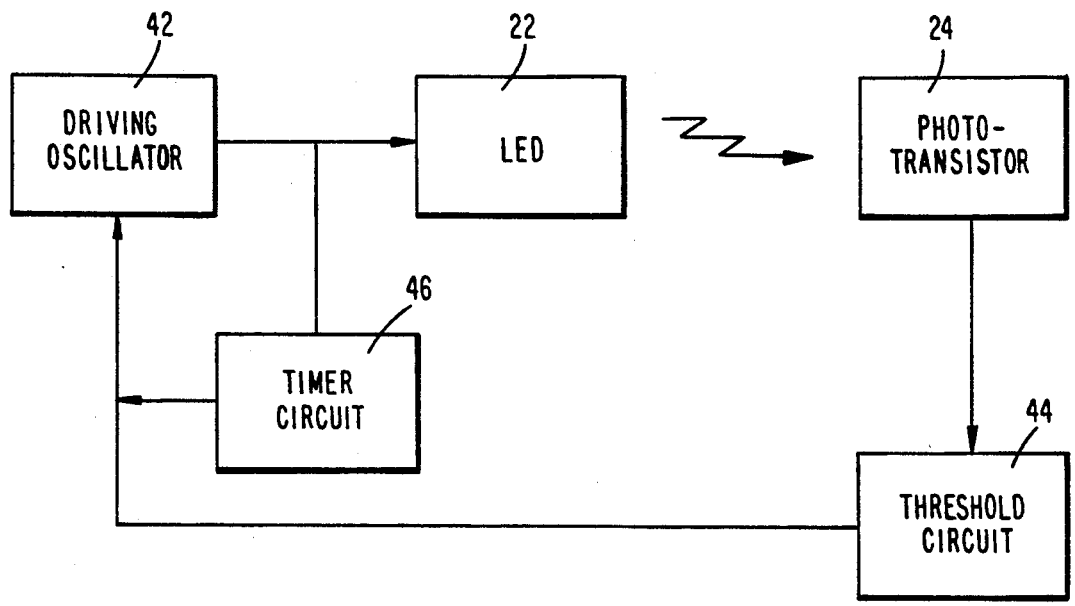
FIG. 3a is a block-diagram showing a feedback control strategy according to the preferred embodiment of the present invention.

Reference is again made to FIG. 1 of the drawings showing a typical optical sensor 20 of a type that may be incorporated in an electricity meter. In accordance with the preferred embodiment of the invention, the optical sensor 20 may be a Siemens SFH900 miniature light reflection emitter/sensor which consists of a single infrared light-emitting diode (LED) 22 and an NPN phototransistor 24 mounted in a single plastic package. The SFH900 is a three terminal device having an LED anode, phototransistor collector and common ground terminal. The rotating disk 26 is positioned so as to reflect incident light radiated by the LED onto the phototransistor. In an electricity meter, the separation distance between the reflective surface of the meter disk and the sensor is ideally 1 mm (0.040"), however sensitivity is approximately 20% of optimum over the range of 0.5 mm to 4 mm (0.020" to 0.15"). The non-reflective areas 28b are represented by black bars, whose width should be at least 10 mm (0.4") to accommodate the maximum sensor distance of 0.1".

Due to the reflection of sunlight off the meter disk, shown in FIG. 2a, performance of the sensor may be ensured in full sunlight, in accordance with one aspect of the invention, by providing it with an absorptive collar 32, as shown in FIG. 2b. This collar 32 is a thin flat piece of black material, which prevents reflected sunlight from falling on the sensor and saturating the phototransistor as tends to occur in the prior art arrangement of FIG. 2a. The collar may be, for example, about 1" in diameter to ensure that no multiple reflections of incident sunlight can fall on the phototransistor.

Reference is now made to FIG. 3a illustrating a feedback control strategy according to the preferred embodiment of the present invention. A LED 22 is supplied with intermittently interrupted electric energy produced by a driving oscillator 42. When the light reflected from a reflective area 28a on the disk 26 falls on a phototransistor 24, the output of the phototransistor goes low. When the output of the phototransistor goes below a threshold level signifying that the LED has been turned on, a threshold circuit 44 coupled to the output of the phototransistor interrupts the driving oscillator 42 to turn off the LED 22. Therefore, no more power is used in the LED than is necessary to transmit the light signal to the phototransistor.

Under non-reflective conditions when the light is absorbed by a non-reflective area 28b of the disk 26, the output of the phototransistor 24 remains high. A timer circuit 46 connected to the output of the driving oscillator 42 interrupts the driving oscillator 42 to turn off the LED 22 after expiration of a preset time period after the previous interruption of the driving oscillator. The preset time period is made slightly longer than the response time of the phototransistor. Accordingly, during the non-reflective period the timer circuit 46 leaves the LED 22 on only for a short time interval required to make sure that the phototransistor is off.

Figure 3B:
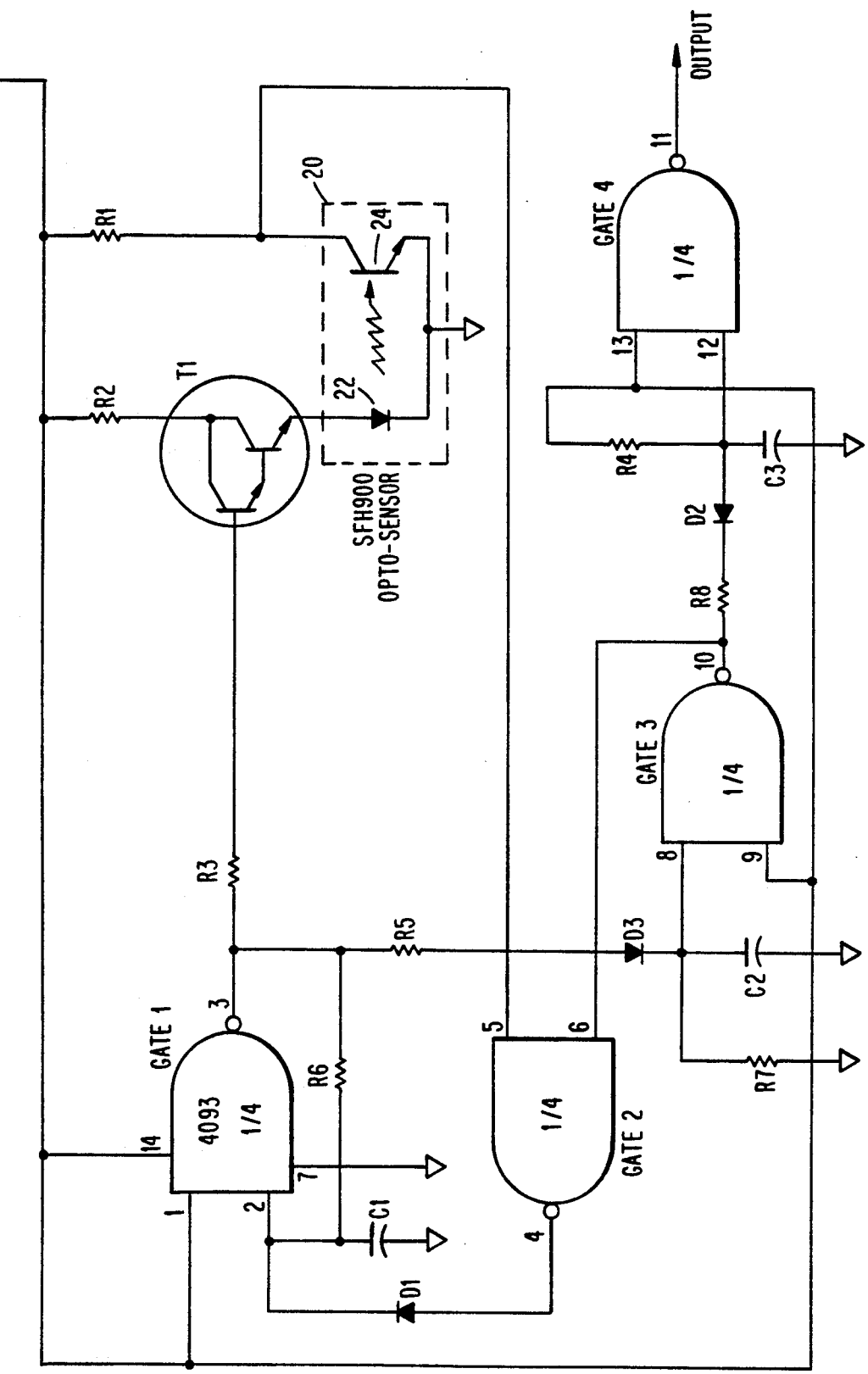
FIG. 3b is an electrical diagram of an optical sensor with control circuitry according to the preferred embodiment of the present invention.

Reference is now made to FIG. 3b showing a schematic diagram of the optical sensor provided with control circuitry according to the preferred embodiment of the present invention. As the SFH900 optical sensor uses CMOS logic levels, any output voltage of the sensor above 3.5 volts is represented by a logic 1, any output voltage below 1.5 volts is represented by a logic 0. Supply voltage for CMOS circuitry is equal to 5 volts.

During non-reflective periods when the light radiated by the LED 22 is absorbed by a non-reflective area 28b of the disk, the phototransistor 24 is off. Its collector voltage remains high. Therefore, under non-reflective conditions the output voltage of the sensor is represented by a logic 1. Under the worst case conditions the output voltage should not fall below 3.5 volts if the reflective surface is black. Since the supply voltage is +5 volts, the voltage drop across current sensing resistor R1 must be less than 1.5 volts.

During reflective periods when the light reflected from a reflective area 28a on the disk falls on the phototransistor 24, this light causes a photocurrent equal to about 2 mA to flow in the phototransistor. As a result, its collector voltage drops to about 1 volt. Therefore, under reflective conditions the output voltage of the sensor is represented by a logic 0.

According to the preferred embodiment of the invention, the control circuitry of the optical sensor is designed around a 4093 Quad 2-input NAND gate with Schmitt trigger. The 4093 circuit comprises four 2-input NAND gates 1-4. The control circuitry comprises a 120 Hz resistance-capacitance (R-C) oscillator formed by the NAND gate 1 in conjunction with resistor R6 and capacitor C1. The R-C oscillator is used for pulsing the LED 22 in order to provide intermittent light with increased peak brightness.

The rate at which the LED must be pulsed depends on the rate, at which the disk rotates, and on the number of the non-reflective areas on the disk. The rotation rate of a J-5 meter disk used in the preferred embodiment of the invention is 111.111 RPM or 1.85185 Hz. To determine the LED pulse rate, the width of the non-reflective areas on the disk must be considered. As indicated above, the width of a black bar representing a reflective areas should be 10 mm (0.4") minimum to allow for the maximum distance between sensor and disk, which is 4 mm (0.15"). The pattern of bars is assumed to be 6 equal width bars around the disk separated by a distance equal to their width. Each bar will subtend a 30° angle ($\pi/6$ radians). The disk diameter is 3.75". Assuming that the sensor is located 0.625" from the outer edge of the disk, at a 1.25" radius, the width of a bar (or space) at that point is 0.66". Since 0.4" minimum width is needed, a pulse must occur before the bar moves 0.26" (=0.66"−0.4"). Therefore, there must be at least 31 pulses of the LED for every disk revolution. With a disk angular rate of 1.85 Hz, the minimum required LED pulsing rate is then 31×1.85=57.3 Hz. To provide some margin, a 120 Hz pulsing rate is selected.

The R-C oscillator pulses the LED through a Darlington circuit T1, which supplies the LED with driving current. In accordance with the preferred embodiment of the invention, MPSA-13 circuit manufactured by Motorola or General Electric may be used as the Darlington circuit T1. Resistor R2 limits the LED driving current.

When the light reflected from a reflective area on the disk falls on the phototransistor, the collector of the phototransistor is pulled low. A threshold control circuit formed by the NAND gate 2 detects this transition in order to turn off the LED. The collector of the phototransistor is connected to input 5 of the NAND gate 2.

Figure 4:
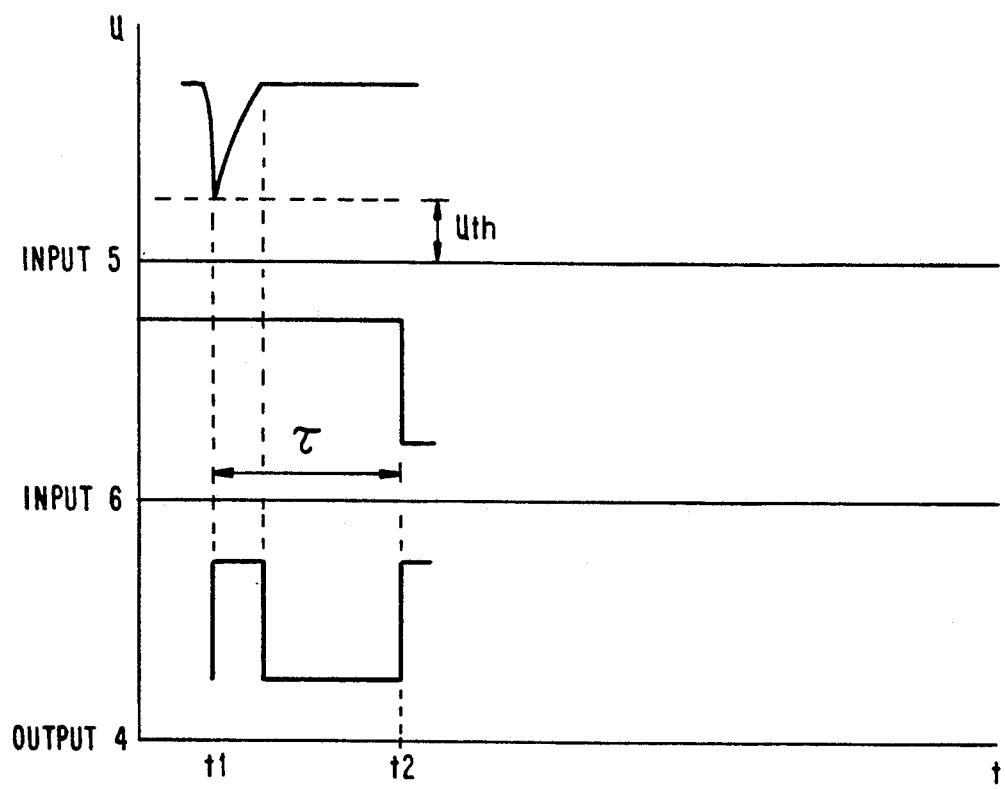
FIG. 4 is a diagram showing waveforms illustrating operation of the control circuitry shown in FIG. 3b.

As shown in FIG. 4, when the collector drops to a predetermined threshold level Uth at time t1, the low level of the input 5 equal to the level Uth causes output 4 of the NAND gate 2 to go high. The output 4 of the NAND gate 2 is connected through diode D1 to one of the inputs of the NAND gate 1, which forms the LED pulsing R-C oscillator. As a result, the high level at the output 4 of the NAND gate 2 cuts off the positive half-cycle of the oscillator, and the LED suspends the radiation of the light.

Thus, during a reflective period the LED is turned off immediately when the phototransistor signals that sufficient light has been reflected to exceed the logic threshold. Therefore, the LED is on for the minimum time possible. No more power is used in the LED than is necessary to transmit the light signal to the phototransistor. The invention accordingly enables power consumption under the reflective conditions to be minimized.

If a non-reflective area of the disk is in the phototransistor's field of view, the collector of phototransistor remains high. However, a timer circuit formed by the NAND gate 3, resistor R5 and capacitor C2 turns off the LED 22 after expiration of a predetermined time period $\tau$, which is equal to the time constant R×C, where R is the resistance of the resistor R5, and C is the capacitance of the capacitor C2. The time constant is made slightly longer than the response time of the phototransistor, which is known and independent of temperature for a given type of phototransistors. The NAND gate 3 is connected to input 6 of the NAND gate 2. The resistor R5 and the capacitor C2 are coupled through diode D3.

As shown in FIG. 4, at time t2 after the predetermined time period $\tau$ after the time t1, the input 6 of the NAND gate 2 goes low, driving high the output 4 of the NAND gate 2. As indicated above, the high level at the output 4 of the NAND gate 2 cuts off the positive half-cycle of the oscillator. As a result, the LED suspends the radiation of the light. In accordance with the preferred embodiment of the invention the predetermined time period is equal to 500 microseconds.

Thus, during a non-reflective period the timer circuit leaves the LED on only for a short fixed time period, which is chosen so as to make sure that the phototransistor is off. The invention accordingly makes it possible to minimize power consumption under the non-reflective conditions.

The threshold and timer circuits provides reduction to one-twentieth of the LED's original duty cycle. That is, the LED is on only 5% of the total time. Accordingly, the mean time to failure (MTTF) of the LED is significantly increased.

In accordance with the preferred embodiment of the invention, to prevent the output of the sensor from multiple transitions, the control circuitry comprises a holding circuit formed by the NAND gate 4, resistors R4, R7, R8 and capacitor C3.

The NAND gate 4 forms the sensor output signal at its output. The capacitor C3 is coupled to one of the inputs of the NAND gate 4 to limit the rate at which the voltage on this input can change. For a low-to-high transition of the NAND gate 4, the capacitor C3 is discharged through resistor R8, coupled to the output of the NAND gate 3. The capacitor C3 is connected to the resistor R8 through diode D2. The capacitor C3 can be discharged when the output of the NAND gate 3 is low. The fraction of time when the output of the NAND gate 3 is low is set by the discharge time constant of the capacitor C2, which is discharged through the resistor R7. For a high-to-low output transition of the NAND gate 4, the capacitor C3 is charged through the resistor R4 coupled to the second input of the NAND gate 4. The time constants of the capacitor C3 charging and discharging are chosen to prevent the NAND gate 4 output state changes at intervals of less than 0.025 sec. This 0.025 sec. interval is equal to three pulse periods of the LED pulsing oscillator. Therefore, three consecutive reflections (or non-reflections) are necessary before the sensor output state can change.

Thus, the output signal of the sensor indicates whether a reflective or non-reflective area of the disk is in the sensor's field of view. As discussed above, a reflective area is represented by a logic 0, and a non-reflective area is represented by a logic 1. A transition of the output from 1 to 0 or from 0 to 1 is registered by a processor (not shown) for determining the disk angular position and/or rotation direction.

Although the preferred embodiment of the invention is disclosed in connection with a movable object that rotates so as to reflect or absorb incident light, the invention may be practiced with the movable object that rotates so as to pass the radiated light during a first time interval and to interrupt the radiated light during a second time interval. For example, a toothed wheel having a plurality of teeth for interrupting the radiated light may be used as such a movable object.

There accordingly has been described an optical sensor for monitoring position of a disk having reflective and non-reflective areas. The sensor comprises a LED, a phototransistor and control circuitry, which is responsive to an output signal generated by the phototransistor for causing the LED to suspend radiation of light. When the light reflected from a reflective area falls on a phototransistor, the control circuitry turns off the LED as soon as the output of the phototransistor goes below a threshold level signifying that the phototransistor has been turned on. When the light is absorbed by a non-reflective area and the phototransistor is not turned on, the control circuitry turns off the LED after a predetermined time period, which is chosen to be slightly larger than the response time of the phototransistor.

The invention accordingly makes it possible to minimize power consumption of the sensor under the reflective and non-reflective conditions and to improve the reliability of the sensor due to increasing mean time to failure of the LED.

In this disclosure, there is shown and described only the preferred embodiment of the invention, but it is to be understood that the invention is capable of changes and modifications within the scope of the inventive concept as expressed herein.

I claim:

1. An optical sensor for monitoring position of the movable means comprising:
light-emitting means for radiating light,
light-receiving means for sensing the light radiated by said light-emitting means and providing an output signal corresponding to received light, and
control means responsive to the output signal for causing said light-emitting means to suspend radiation of the light,
said movable means being positioned so as to provide incidence of the light radiated by said light-emitting means on said light-receiving means in at least one first time interval and to prevent, at least in part, the light radiated by said light-emitting means from falling on said light receiving means in at least one second time interval.

2. The optical sensor of claim 1, wherein said control means comprises threshold means for causing said light-emitting means to suspend radiation of the light in response to a predetermined level of the output signal.

3. The optical sensor of claim 2, wherein the predetermined level of the output signal is formed when light sufficient to turn on said light-receiving means is sensed by said light-receiving means.

4. The optical sensor of claim 2, wherein the predetermined level of the output signal is formed during the first time interval.

5. The optical sensor of claim 1, wherein said control means comprises timer means for causing said light-emitting means to suspend radiation of the light after expiration of a predetermined time period.

6. The optical sensor of claim 5, wherein the predetermined time period depends on the response time of said light receiving means.

7. The optical sensor of claim 6, wherein said timer means causes said light-emitting means to suspend radiation of the light during the second time interval.

8. The optical sensor of claim 1, wherein said control means comprises holding means for maintaining a steady level of the output signal during a period not less than a preset time period.

9. The optical sensor of claim 8, wherein the preset time period includes a plurality of the first time intervals.

10. The optical sensor of claim 8, wherein the preset time period includes a plurality of the second time intervals.

11. The optical sensor of claim 1, wherein said control means comprises driving means for pulsing the light-emitting means at a predetermined rate.

12. The optical sensor of claim 11, wherein said control means causes said light-emitting means to suspend radiation of the light during an interval longer than the pulse-repetition period of said driving means.

13. The optical sensor of claim 11, wherein said driving means is responsive to a predetermined level of the output signal during the first time interval.

14. The optical sensor of claim 11, wherein said driving means is responsive to a predetermined time period during the second time interval.

15. The optical sensor of claim 1, wherein said movable means comprises rotating means for rotating so as to reflect the radiated light during the first time interval and to absorb the radiated light during the second time interval.

16. The optical sensor of claim 15, wherein said rotating means comprises a disk having at least one reflective area for reflecting the radiated light and at least one absorbing area for absorbing the radiated light.

17. The optical sensor of claim 1, wherein said movable means comprises rotating means for rotating so as to pass the radiated light during the first time interval and to interrupt the radiated light during the second time interval.

18. The optical sensor of claim 17, wherein said rotating means comprising a toothed wheel having a plurality of teeth for interrupting the radiated light.

19. The optical sensor of claim 1, further comprising light-absorbing means positioned so as to protect said light-receiving means from ambient light.

20. The optical sensor of claim 19, wherein said light-absorbing means comprises a collar covering said light-receiving means.

21. An optical sensor for monitoring position of a movable member comprising:
a light-emitting device for converting supplied electric energy into light,
a photocell actuated by the light radiated by the light-emitting device for producing an output electric signal corresponding to received light,
a driving circuit coupled to said light emitting device for supplying said light-emitting device with intermittently interrupted electric energy,
a control circuit coupled between said photocell and said light-emitting device for causing said light-emitting device to suspend radiation of the light in response to said output electric signal,
said movable member being positioned so as to provide incidence of the light radiated by said light-emitting device on said photocell in at least one first time interval and to prevent, at least in part, the light radiated by said light-emitting device from falling on said photocell in at least one second time interval.

22. The optical sensor of claim 21, wherein said control circuit comprising threshold circuit for causing said light emitting device to suspend radiation of the light in response to a predetermined level of the output signal.

23. The optical sensor of claim 22, wherein said light-emitting device comprises a light-emitting diode and said photocell comprises a phototransistor.

24. The optical sensor of claim 23, wherein the predetermined level of the output signal is formed when the light sufficient to turn on said phototransistor is sensed by said photocell.

25. The optical sensor of claim 24, wherein the predetermined level of the output signal is formed during the first time interval.

26. The optical sensor of claim 25, wherein said control circuit comprises a timer circuit for turning off said light-emitting diode after expiration of a predetermined time period.

27. The optical sensor of claim 26, wherein the predetermined time period depends from the response time of said phototransistor.

28. The optical sensor of claim 27, wherein said timer circuit turns off said light-emitting diode during the second time interval.

29. The optical sensor of claim 28, wherein said control circuit comprises a holding circuit for maintaining a steady level of the output signal during a period not less than a preset time period.

30. The optical sensor of claim 29, wherein the preset time period includes a plurality of the first time intervals.

31. The optical sensor of claim 29, wherein the preset time period includes a plurality of the second time intervals.

32. The optical sensor of claim 29, wherein said driving circuit comprises a driving oscillator for pulsing the light-emitting means at a predetermined rate.

33. The optical sensor of claim 32, wherein said control circuit causes said light-emitting device to suspend radiation of the light during an interval longer than the pulse-repetition period of said driving oscillator.

34. The optical sensor of claim 33, wherein said driving oscillator is responsive to a predetermined level of the output signal during the first time interval for turning off said light-emitting diode.

35. The optical sensor of claim 34, wherein said driving oscillator is responsive to a predetermined time period during the second time interval for turning off said light-emitting diode.

36. The optical sensor of claim 35, wherein said movable member comprises a rotating member for rotating so as to reflect the radiated light during the first time interval and to absorb the radiated light during the second time interval.

37. The optical sensor of claim 36, wherein said rotating member comprises a disk having at least one reflective area for reflecting the radiated light and at least one absorbing area for absorbing the radiated light.

38. The optical sensor of claim 35, wherein said movable member comprises a rotating member for rotating so as to pass the radiated light during the first time interval and to interrupt the radiated light during the second time interval.

39. The optical sensor of claim 38, wherein said rotating member comprising a toothed wheel having a plurality of teeth for interrupting the radiated light.

40. The optical sensor of claim 21, further comprising a light-absorbing screen positioned so as to protect said photocell from ambient light.

41. The optical sensor of claim 40, wherein said light-absorbing screen comprises a collar covering said photocell.

42. A method of monitoring a moving object using a light-emitting device and a photocell, said method comprising the steps of:
radiating light by said light-emitting device,
sensing the radiated light by said photocell for producing an output signal,
positioning said movable object so as to provide incidence of the light radiated by said light-emitting device on said photocell in at least one first time interval and to prevent, at least in part, the light radiated by said light-emitting device from falling on said photocell in at least one second time interval,
suspending the radiating in response to a predetermined level of the output signal during the first time interval,
suspending the radiating after expiration of a predetermined time period during the second time interval.

43. The method of claim 42, wherein said step of suspending the radiating in response to a predetermined level of the output signal includes the step of suspending radiating when the light sufficient to turn on said photocell is sensed by said photocell.

44. The method of claim 43, further including the step of supplying said light-emitting device with intermittently interrupted electric energy.

45. The method of claim 42, further including the step of maintaining a steady state level of the output signal during a preset time period.

46. The method of claim 42, wherein said step of positioning includes the step of rotating the moving object so as to reflect the radiated light during the first time interval and to absorb the radiated light during the second time interval.

47. The method of claim 42, wherein said step of positioning includes the step of rotating the moving object so as to pass the radiated light during the first time interval and to interrupt the radiated light during the second time interval.

* * * * *